Jan. 2, 1940.    O. GANO    2,185,372
STEAM COOKER
Filed April 28, 1938
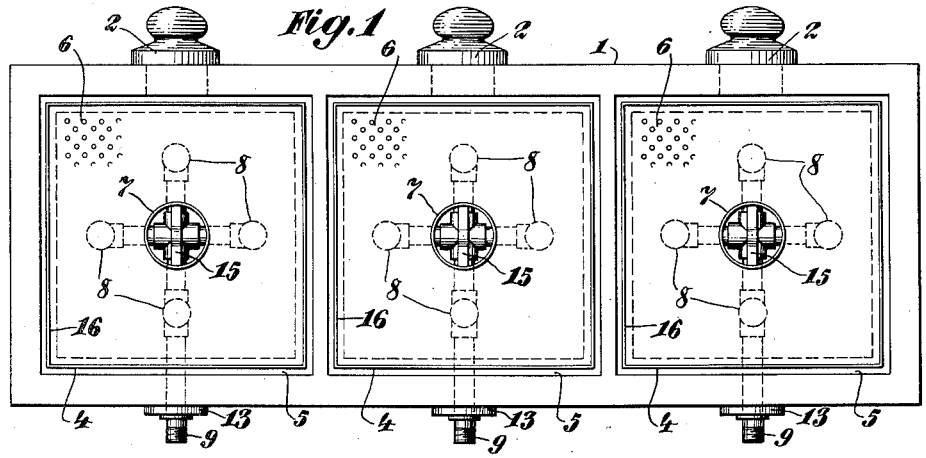
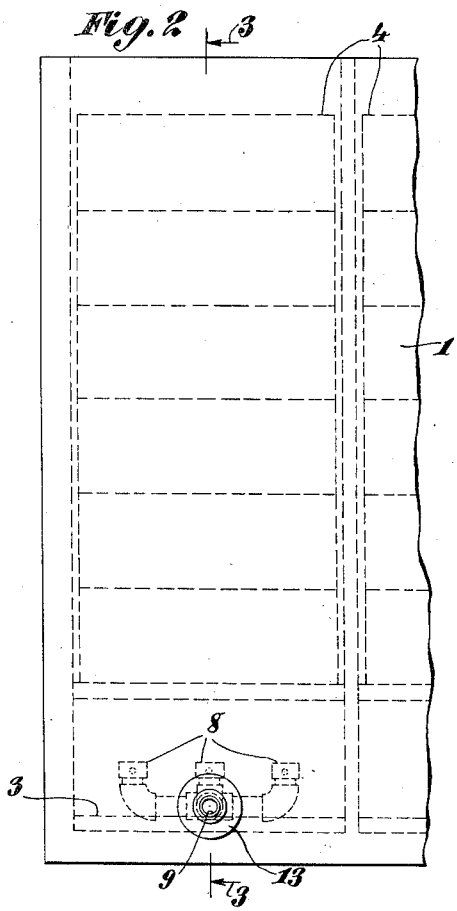
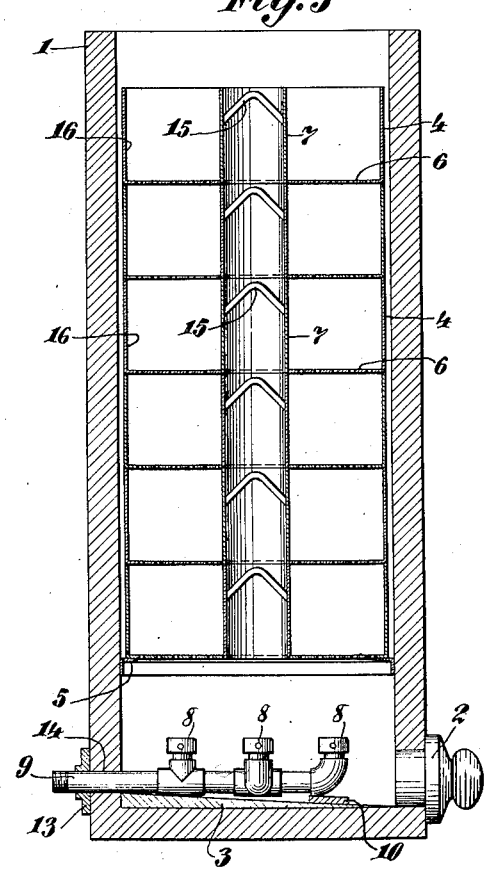
INVENTOR.
*Orville Gano,*
BY *Hoguet, Neary & Campbell,*
ATTORNEYS Patented Jan. 2, 1940

2,185,372

UNITED STATES PATENT OFFICE 2,185,372

STEAM COOKER

Orville Gano, Burley, Idaho, assignor to Potato Corporation of Idaho, Garwood, N. J., a corporation of Idaho Application April 28, 1938, Serial No. 204,793

10 Claims. (Cl. 53—2)

The present invention relates to a method and apparatus for cooking foodstuffs and more particularly relates to methods and apparatuses for cooking vegetables such as, for example, potatoes and other starchy materials.

Potatoes, for example, are high in starch which is gelatinized by heat in the presence of moisture. If acids are present in any appreciable amount, the gelatinized starch may be hydrolyzed into other forms of carbohydrates which have characteristics quite different than the original potatoes. These carbohydrates may have such characteristics as a yellowish color, a gelatinous or gluey texture, and a tendency to harden in solid mass on drying.

When, for example, it is desired to produce a dehydrated potato product which may be heated and mixed with water or other liquid to produce mashed potatoes of high quality, it has been found that ordinary cooking devices and processes cannot produce a mealy and white product. This is due to the fact that the cooking temperatures and duration of cooking cannot be accurately controlled, thereby causing gelatinization and hydrolyzation of the starch as pointed out above.

Starch cells are composed of a cell sheath or covering and nuclear material containing substances such as phosphorus compounds which, upon contact with water, are converted to acids. The covering of the starch cell normally retains the nuclear material against change, but on disruption will allow acids to be formed, which in turn cause hydrolysis of the starchy material to take place.

It has been found that sudden changes in the temperature of the starch cells cause them to swell and burst while less abrupt changes allow some adjustment in size without bursting, so long as the cells are not subjected to excessive cooking temperatures and prolonged over-cooking. If substantially all of the starch cells are retained in an undisrupted condition, the cooked product has a mealy texture and a white color which are retained on drying and which are unaltered by heating in the presence of liquid at a later time.

Accordingly, it is an object of this invention to provide a method and apparatus for cooking products whereby the products may be subjected to a gradual and controlled increase in temperature.

Another object of this invention is to provide a method and apparatus whereby the cooking of the product will be uniform throughout all portions thereof.

A further object of this invention is to provide a method and apparatus whereby cooking of the materials may be terminated quickly and efficiently at any desired time.

Other objects of this invention will become apparent from the description of typical embodiments of the invention set forth hereinafter.

The objects of this invention may be attained by means of a cooker, which allows ready control of cooking temperatures and changes in cooking temperatures and which includes an arrangement of heating means and receptacles for the material to be cooked which causes uniform heating of the material and uniform circulation of the heating medium. The cooker may consist of a receptacle which is provided with means for supporting one or more perforated receptacles for receiving the material to be cooked and is so arranged that the material is disposed between a centrally located, substantially unobstructed, vertical channel and the outer periphery of the cooker. The cooker may be filled with cold water and heat is applied, preferably by means of steam jets located beneath the product and adjacent the sides of the cooker. This causes the water to be heated gradually and to circulate upwardly through the central vertical channel and downwardly through the product, thus maintaining a substantially uniform temperature throughout the cooker and assuring gradual change of temperature without the formation of static zones of different temperatures.

In order that the invention may be better understood, reference may be had to the accompanying drawing which shows a specific embodiment of apparatus suitable for this method of cooking, and in which:

Figure 1 is a plan view of a bank of three cookers;

Figure 2 is a partial front view of the bank of cookers; and

Figure 3 is a cross-sectional view taken along the line 3—3 of Figure 2 and looking in the direction of the arrows.

Referring to the drawing, one form of the invention is shown in which a bank of three cookers 1 is used. Obviously, however, the invention may be embodied in one or more such cookers. Each cooker is of similar construction and the description will be limited to one of them. The cooker 1 is adapted to hold a considerable quantity of water and, preferably, is insulated or constructed of material having a low heat conductivity. A removable plug 2 is provided adjacent the lower edge of the inclined floor 3, so that the water in the cooker may be drained rapidly. A plurality of receptacles 4 of length and width substantially that of the inside of the cooker 1 are maintained one above the other an appreciable distance above the floor 3 by means of a flanged member 5, which is mounted on the inner wall of the cooker. The receptacles are constructed with perforated bottoms 6 and inner cylindrical walls 7 which are preferably imperforate. Bails 15 are provided in order to facilitate removal of the receptacles. A member 10 may be provided for supporting a plurality of steam nozzles 8 parallel to and spaced from the perforated bottoms 6 of the receptacles 4. Steam is supplied to the nozzles 8 by means of inlet pipe 9, which is suitably connected thereto and which enters the cooker through a ring 13 and an opening 14 in the side of the cooker. The nozzles are preferably arranged concentrically and radially outwardly from the channel formed by the walls 7 of the receptacles 4.

In operation, products such as peeled and sliced potatoes are placed in the portions of the receptacles 4 between the walls 7 and 16, respectively. One or more of the receptacles 4 are then placed in the cooker. When a plurality of the receptacles 4 are used, an elongated cylindrical channel is formed by the aligned inner walls 7 of the receptacle. The cooker may be filled with cold water and steam is introduced through the nozzles 8 with the result that the water is heated and circulated upwardly through the central channel formed by the inner walls 7 and downwardly through the perforated bottoms of receptacles and the product disposed thereon. By regulating the temperature and amount of the steam admitted, the rate of heating may be effectively controlled, and such a gradual change of temperature results that disruption of the potato cells is avoided. The circulation of the water as described insures a uniform cooking of the potatoes and uniformity of temperature throughout the entire cooker. Obviously, any heated vapor which would not have a deleterious effect on the materials to be cooked could be substituted for the steam. When the cooking is completed, the supply of steam is shut off and the heated water may be quickly emptied from the cooker by removing the plug 2.

With the construction described above, cooking may be accomplished at any desired temperature up to the boiling point of the liquid in the cooker and positive control of the cooking temperature and change of temperature may be had at all times. Likewise, the cooking operation may be terminated quickly and the cooked articles drained with great facility without removal from the cooker.

It will be understood that the cooker and process described above may be susceptible to many changes without departing from the invention, and, therefore, the embodiments described should be considered as illustrative only and not as limiting the scope of the following claims.

I claim:

1. In a cooking device, the combination of a container adapted to hold water, at least one receptacle for material to be cooked removably disposed in said container in spaced relation to the bottom of the container, means in said receptacle forming a vertical channel centrally of the receptacle, and means for injecting heated vapor into water contained in the container, said means being positioned beneath said receptacle and outwardly of the said channel.

2. In a cooking device, the combination of a container adapted to hold water, receptacles for material to be cooked removably disposed in said container in spaced relation to the bottom of the container, means in said receptacles forming a vertical channel centrally of the receptacles, and a plurality of spaced steam jets beneath said receptacles and outwardly of the said channel.

3. A cooker comprising a container adapted to hold a quantity of water, a plurality of receptacles having perforated bottoms and tubular inner walls, means positioning said receptacles one upon the other with the tubular walls in substantial alignment, and heating means in said container positioned beneath the perforated bottoms of the receptacles.

4. A cooker comprising a container adapted to hold a quantity of water, a plurality of receptacles for receiving the materials to be cooked removably disposed in said container in spaced relation to the bottom of the container, said receptacles having perforated bottoms and tubular inner walls forming a vertical channel centrally of the container, and means in said container for injecting heated vapor into water held in the container, said means being positioned beneath the perforated bottoms of the receptacles.

5. A cooker comprising a container adapted to hold a quantity of water, a plurality of receptacles for receiving the materials to be cooked removably disposed in said container in spaced relation to the bottom of the container, said receptacles having perforated bottoms and inner tubular walls forming a vertical channel centrally of the container, and a plurality of spaced steam jets in said container positioned beneath the perforated bottoms of the receptacles.

6. Apparatus as claimed in claim 5 in which the receptacles for receiving the material to be cooked include bails connected to the inner walls thereof extending transversely of the central channel for facilitating removal of the receptacles.

7. Apparatus as claimed in claim 5 in which the container includes an inclined bottom and a removable plug adjacent thereto for facilitating withdrawal of water held in the container.

8. A method of cooking materials such as vegetables and the like comprising positioning said materials about a central vertical channel in a vessel filled with cold water, and injecting heated vapor into the vessel beneath the materials so that the water is heated gradually and flows upwardly through the central channel and downwardly through the materials.

9. A method of cooking materials such as vegetables and the like comprising positioning said materials about a central vertical channel in a vessel filled with cold water, and injecting heated vapor into the vessel beneath the material so that the water is heated gradually and flows upwardly through the central channel and downwardly through the materials and terminating the flow of steam and rapidly withdrawing the heated water when the cooking is complete.

10. A method as claimed in claim 9 in which the heated vapor injected into the vessel is steam.

ORVILLE GANO.